United States Patent [19]

Gregorian et al.

[11] 4,229,800
[45] Oct. 21, 1980

[54] ROUND OFF CORRECTION LOGIC FOR MODIFIED BOOTH'S ALGORITHM

[75] Inventors: Roubik Gregorian, Sunnyvale; Kadiri R. Reddy, Santa Clara, both of Calif.

[73] Assignee: American Microsystems, Inc., Santa Clara, Calif.

[21] Appl. No.: 966,870

[22] Filed: Dec. 6, 1978

[51] Int. Cl.³ ............................................. G06F 7/52
[52] U.S. Cl. ................................. 364/745; 364/757; 364/758
[58] Field of Search ............... 364/745, 757, 758, 759, 364/760

[56] References Cited

U.S. PATENT DOCUMENTS

| | | | |
|---|---|---|---|
| 3,290,493 | 12/1966 | Githens, Jr. et al. | 364/745 |
| 3,878,985 | 4/1975 | Ghest et al. | 364/759 |
| 3,885,141 | 5/1975 | Kieburtz | 364/745 |
| 4,153,938 | 5/1979 | Ghest et al. | 364/760 |

OTHER PUBLICATIONS

S. Waser, "High-Speed Monolithic Multipliers for Real-Time Digital Signal Processing", *Computer*, Oct. 1978, pp. 19–29.

*Primary Examiner*—Jerry Smith
*Attorney, Agent, or Firm*—Owen, Wickersham & Erickson

[57] ABSTRACT

A round off correction logic circuit is disclosed for inclusion within a floating point arithmetic binary digital multiplier implementing a modified Booth's algorithm for generating a final product of binary digits. The round off logic circuitry is connected in the multiplier for rounding its final product off to a predetermined binary digit without requiring the multiplier to generate any of the less significant binary digits to the right of the predetermined binary digit. Multiplier circuitry otherwise required to generate an unrounded final product prior to round off is eliminated without loss of accuracy in round off.

2 Claims, 3 Drawing Figures

ROUND OFF CORRECTION LOGIC FOR MODIFIED BOOTH'S ALGORITHM

BACKGROUND OF THE INVENTION

The present invention relates to round off correction logic in digital multipliers, and more particularly the present invention relates to round off correction logic in multipliers implementing the modified Booth's algorithm to perform floating point arithmetic multiplication.

The modified Booth's algorithm was a known technique to increase speed in digital multiplier circuits. The algorithm, first used in the IBM 360 series of computers, reduced the number of partial products by over half those required in straight combinatorial multipliers, with a consequent reduction in the number of carry-save-add stages, and hence number of total gates ultimately required. In essence, Booth's algorithm called for the multiplication operation to skip over any contiguous string of all ones and all zeros, rather than form a partial product for each bit. While skipping over a string of zeros was straightforward, skipping over a string of ones was more complex. One approach was to evaluate a string of ones by subtracting the weight of the right-most one of the string from its modulus (the modulus of an n-bit word is defined as $2^n$, and the weight of any nth bit is $2^{n-1}$, counting from the right). Applying this approach to the binary string 11110000, for example, yielded n=8; and $2^8 - 2^4 = 256 - 16 = 240$.

In prior hardward multiplier implementations of Booth's algorithm, each multiplier was divided into substrings of three adjacent bits, with adjacent substrings sharing one bit in common. The algorithm required two's complement numbers with padding left and right substrings with zeros to complete the substrings and to be sure that the multiplier value was not treated as a negative number. In essence, the modified Booth's algorithm was a multiplier encoding scheme which included a constant shift of two bits at a time and examination of three multiplier bits to produce fewer partial products than otherwise required in conventional multiplication (five in the case of eight bit multiplier, etc.).

One standard implementation in LSI of the modified Booth's algorithm multiplier, was found in the single chip type 67558 eight-bit-by-eight-bit multiplier manufactured by Monolithic Memories, Inc. and described in an article by Waser and Peterson entitled "Real Time Processing Gains Ground With Fast Digital Multiplier" in *Electronics* magazine, Vol. 50, No. 20, Sept. 29, 1977, pages 93–99. Another LSI implementation of a parallel modified Booth's algorithm multiplier was described by Nicholson, Blasco and Reddy in a paper entitled "The S2811 Signal Processing Peripheral" presented at the 1978 WESCON Professional Program, Los Angeles, Calif., Sept. 12, 13, 14, 1978, and published in the Proceedings of Session 25, entitled "Designing With Single Chip Multipliers," pp. 25/3:1–12.

One principal drawback of high speed multipliers of prior modified Booth's algorithm implementations arose in connection with round off procedures often utilized in handling fractional numbers. For example, the approach utilized in connection with the MMI67558 multiplier (as described at pages 97-98 of the *Electronics* magazine article identified above) was to generate a full sixteen bit product from the eight bit by eight bit multiplication, and then apply round off procedures to the final full product. For example, to round the final product off to eight most significant bits, 0.5 was added to the part to be discarded and then the final product was truncated at the eighth least significant bit. Such a procedure was very wasteful in both power consumption, speed and LSI topology.

OBJECTS OF THE INVENTION

One object of the present invention is to provide a fast digital multiplier circuit which generates a rounded off output at a selectable bit position without generating a full product output.

Another object of the present invention is to provide a fast digital multiplier yielding a rounded off output with a minimum of circuit elements to reduce multiplier size and power consumption.

A further object of the present invention is to provide a large scale integrated fast digital multiplier chip which generates a rounded off product output without having to generate a full product output, thereby decreasing required chip size and power consumption and increasing production yields.

Yet another object of the present invention is to provide round off correction logic for a digital multiplier implementing a modified Booth's algorithm which rounds to a selected bit position by generating partial products and carrys for the bit position and for the two immediately adjacent bit positions to the right.

SUMMARY OF THE INVENTION

The round off correction logic circuitry in accordance with the principles of the present invention replaces multiplication and summation circuitry otherwise found in modified Booth's algorithm multipliers for generating a final product including the predetermined number of least significant bits to be rounded off. The round off correction logic circuitry operates by analyzing the magnitude of the final product at a predetermined bit position of final round off as well as two adjacent bit positions to the right thereof. Since digital multipliers performing floating point arithmetic operate upon fractional numbers, round off can be accurately accomplished in practically all cases by considering the final product at the predetermined bit position and the two adjacent positions to the right. The round off correction logic circuitry includes two partial product generators and is connected to some of the remaining partial product generators and summation networks of the multiplier in a configuration which provides an accurate rounded off final product with simple combinatorial logic elements without need to generate or need for circuitry for generating the least significant bits of the final product to be rounded off.

In one preferred embodiment of the present invention n−1 least significant bits of a final product are to be rounded off to the nth least significant bit in the modified Booth's algorithm multiplier. Such multiplier includes a first stage comprising a plurality of partial product generators, a second stage of a plurality of summing networks including a first summation network and a second summation network, a third stage including a third summation network, and a fourth stage including a fourth summation network for putting out a final product in excess of eight binary digits. The round off logic circuitry in the multiplier rounds off to the nth least significant binary digit of the final product without requiring the multiplier to generate the n−1 least significant binary digits of the final product.

The preferred form of round off correction logic circuitry includes in the first stage of the modified Booth's algorithm multiplier a series of partial product generators for generating the following partial products from a binary multiplicand (X) and a binary multiplier (Y) where the subscript following X or Y indicates bit position therein with "n" symbolizing the bit position of the selected least significant bit of the rounded off final product, where the letters "A", "B", "C", "D" symbolize partial products, and where the letter "S" symbolizes a calculated sum bit:

The round off logic circuitry in the multiplier further includes a first-carry signal generator stage connected to the partial product generators described above for generating a first carry signal $C[n-1]1$ defined in accordance with the formula:

$$C[n-1]1 = (B[n-2]+A[n-2])\cdot(A[n-2]+B[n-2]) + A[n-3])\cdot(A[n-3]+B[n-3]+B[n-2]) \quad (1)$$

and for supplying the first carry signal as a carry input $C[n-1]1$ to the first summation network of the multiplier.

The multiplier round off logic circuitry also includes a second carry signal generator stage also in connection to the partial product generators described above for generating a second carry signal $C[n-1]3$ defined in accordance with the formula $$C[n-1]3 = (C[n-2]+D[n-2]+Y[n-1])\cdot(C[n-2] - C[n-3]+Y[n-1 \\ ])\cdot(C[n-2]+C[n-3]+D[n-2 \\ ])\cdot(C[n-3]+D[n-2]+Y[n-1]) \quad (2)$$

and for supplying the second carry signal $C[n-1]3$ to the second summation network of the multiplier.

The round off logic circuitry further includes a third carry signal generator stage connected to the partial product generators described above for generating a third carry signal $C[n-1]4$ defined in accordance with the formula:

$$C[n-1]4 = C[n-2]\cdot D[n-2]\cdot Y[n-1]\cdot C[n-3] \quad (3)$$

(where $Y[n-1]$ is the seventh significant bit to the right of the round off bit of the multiplier). This generator stage supplies the third carry signal $C[n-1]4$ to the third summation network of the multiplier.

The round off logic circuitry finally includes a fourth carry signal generator stage which also provides a final rounded product least significant bit output. The fourth carry signal generator stage is connected to the partial product generators and to the third summation network and functions to generate a fourth carry signal $C(n)1$ defined as follows:

$$C(n)1 = W[n-1]\cdot(S[n-2]1+S[n-2]2) \quad (4)$$

and the least significant bit (n) rounded product output $Pn$ defined:

$$Pn = W[n-1] \oplus (S[n-2]1+S[n-2]2) \quad (5)$$

where $W[n-1]$ is the least significant bit carry signal from the third summation network, and $$S[n-2]1 = \overline{A[n-2]}\cdot[B[n-2] \oplus (A[n-3]+B[n-3]) \\ ]+A[n-2]\cdot[\overline{B[n-2]} \oplus (A[n-3]+B[n-3])] \quad (6)$$

and $$S[n-2]2 = \overline{C[n-2]}\cdot[d[n-2] \oplus Y[n-1] \oplus C[n-3 \\ ]]+C[n-2)\cdot[\overline{D[n-2]} \oplus Y[n-1] \oplus C[n-3]] \quad (7)$$

The fourth carry signal generator stage supplies the fourth summation network with the fourth carry signal and also provides the least significant bit Pn of the rounded product output at the output of the modified Booth's algorithm multiplier.

Other objects, advantages and features of the invention will become apparent from the following detailed description of embodiments presented in conjunction with the accompanying drawings.

DETAILED DESCRIPTION OF A PREFERRED EMBODIMENT

Figure 1:
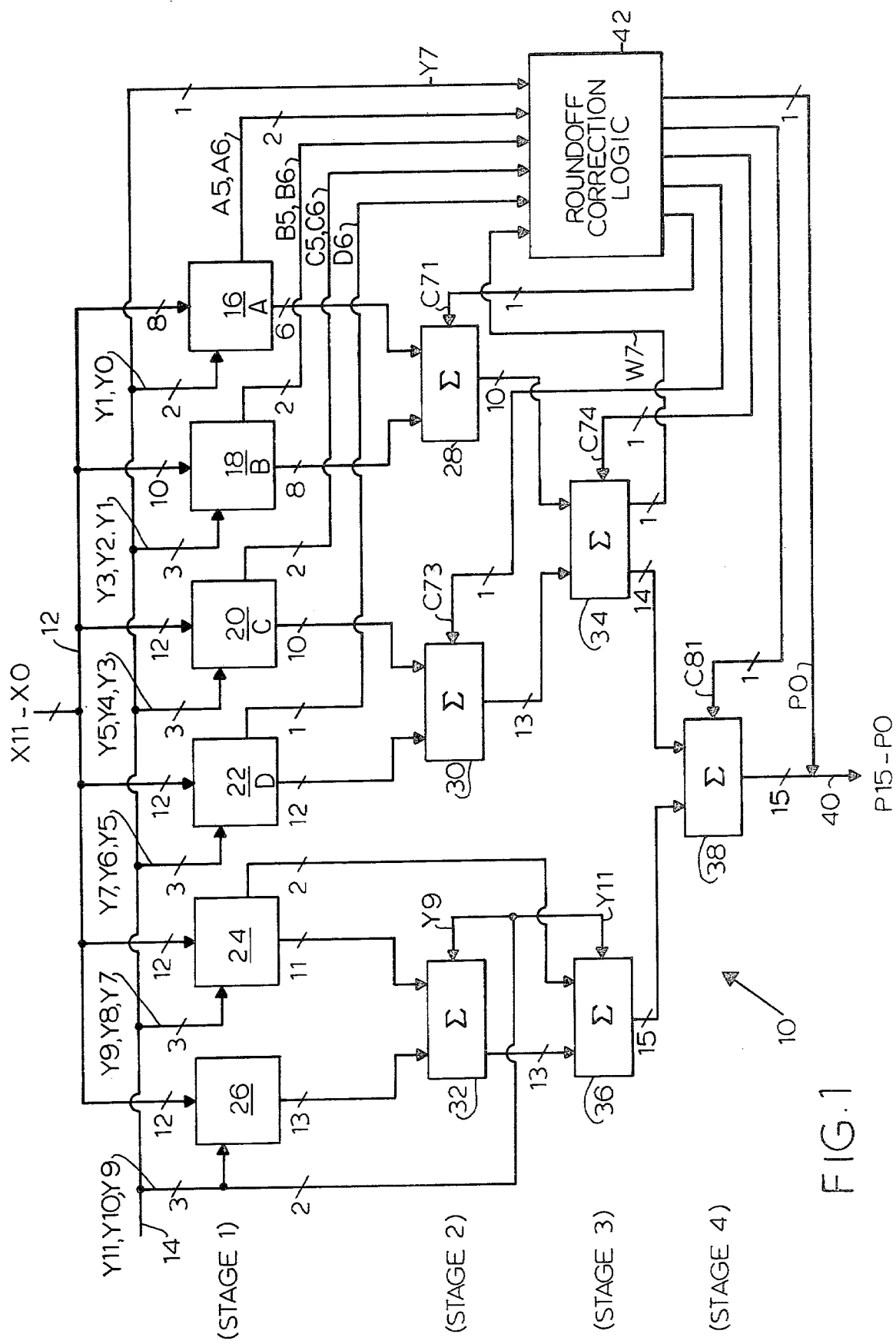
FIG. 1 is a block diagram of a modified Booth's alogrithm multiplier including round off correction logic in accordance with the principles of the present invention.

A 12-bit (X11-Xφ) by 12-bit (Y11-Yφ) modified Booth's algorithm digital multiplier 10 is shown in FIG. 1. Preferably, although not necessarily, the multiplier is implemented as, or as a portion of, an NMOS large scale integrated circuit. VMOS technology, as described in U.S. Pat. No. 3,924,265, which is assigned to the assignee of the present invention, is ideally suited for implementation of a high speed digital multiplier as, or as part of, a monolithic integrated circuit.

The multiplier 10 includes a multiplicand bus 12 which is 12 bits wide (X11-X0) and a multiplier 14 which is also 12 bits wide (Y11-Y0). A conventional 12-bit by 12-bit modified Booth's algorithm multiplier would require circuitry which is sufficient to generate a 24 bit final product. The multiplier 10 shown in FIG. 1 generates a final product of 16 bits with the least significant bit P0 being the ninth least significant bit of a full 24 bit product, with the eight least significant bits not generated in accordance with the present invention.

The multiplicand bus 12 and multiplier bus 14 are connected to six partial product generators 16, 18, 20, 22, 24, and 26 at the first stage of the multiplier 10, as shown in FIG. 1. Thus, bits X0 through X7 of the multiplicand bus 12 and bits Y0 and Y1 of the multiplier bus 14 are supplied to the partial product generator 16. The partial product generator 18 receives from the multiplicand bus 12 bits X0 through X9 and from the multiplier bus 14 bits Y1, Y2 and Y3. The partial product generator 20 receives all 12 bits of the multiplicand bus 12 and bits Y3, Y4, and Y5 of the multiplier bus 14. The partial product generators 22, 24, and 26 each receive all 12 bits of the multiplicand bus 12, and the generator 22 receives bits Y5, Y6 and Y7 of the multiplier bus while the multiplier 24 receives bits Y7, Y8 and Y9 from the multiplier bus 14 and the generator 26 receives bits Y9, Y10 and Y11 from the multiplier bus 14. Each of the six partial product generators 16, 18, 20, 22, 24 and 26 include individual generator elements 100 which generate each partial product. The elements 100 are replications of the circuit shown in FIG. 3 and described below in connection therewith.

Referring again to FIG. 1, a second stage of the modified Booth's alogrithm 10 includes three summation networks 28, 30 and 32. The summation network 28 receives six bits from the partial product generator 16 and eight bits from the partial product generator 18. The summing network 30 receives ten bits from the partial product generator 20 and twelve bits from the partial product generator 22. The summing network 32 receives eleven bits from the partial product generator 24 and thirteen bits from the partial product generator 26.

A third stage of the modified Booth's algorithm multiplier 10 includes two summing networks 34 and 36. The summing network 34 receives ten bits from the summing network 28 and thirteen bits from the summing network 30. The summing network 36 receives two bits from the partial product generator 24 and thirteen bits from the summing network 32. The summing network 32 receives one bit, Y9, from the multiplier bus 14, and the summing network 36 receives one bit, Y11, from the multiplier 14.

A fourth stage of the modified Booth's algorithm multiplier 10 includes a summing network 38 which receives fourteen bits from the summing network 34, and it also receives fifteen bits from the summing network 36. The summing network 38 provides the output 40 from the multiplier 10 with fifteen parallel bit positions being provided directly from the summing network 38 and the least significant bit position, P0, being provided from round off correction logic circuitry 42.

The correction logic circuitry 42 (shown in FIG. 2) rounds off what would otherwise be the eight least significant bits of the twenty four bit product so that the output 40 of the multiplier 10 is sixteen bits, rather than twenty four. In the preferred embodiment, n=8, or the least significant rounded bit will be the ninth least significant bit, were the full product to be generated prior to round-off. The round off correction logic 42 is connected to partial product generator elements 100 within the multiplier 10. The circuitry 42 receives seven inputs A5, A6, B5, B6, C5, C6, D6 from the multiplier 10 each of which is generated by a partial product generator element 100. With n=8, A5 corresponds to A[n−3]; A6 equals A[n−2]; B5 equals B[n−3]; C5 corresponds to C[n−3]; C6 equals C(n−2); and, D6 corresponds to D(n−2) as defined in equations (1) to (7), above.

The logic 42 provides five outputs: C71(C[n−1]1 from equation (1)); C73(C[n−1]3 from equation (2)); C74 (C[n−1]4 from equation (3)); C81 (C[n]1 from equation (4)); P$\phi$ (Pn from equation (5)) internally, the logic 42 generates two intermediates; S61 (S[n−2]1 from equation (6)); and, S62 (S[n−2]2 from equation (7)).

One input, Y7 (Y[n−1]) to the round off correction logic 42 is provided directly from the multiplier bus 14. Two inputs, A5 and A6, are provided from the output of the first partial product generator 16. Two inputs, B5 and B6, are provided from the output of the second partial product generator 18. Two inputs, C5 and C6, are provided to the round off correction logic 42 from the output of the third partial product generator 20, and one input, D6, is provided from the partial product generator 22 to the round off correction logic 42. A carry signal, W7 (W[n−1]), which is one of the outputs of the summing network 34 in the third stage of the multiplier 10, is provided as an input to the round off correction logic circuit 42.

The five outputs from the round off correction logic are connected as follows: the output C71 is supplied as a carry input to the summing network 28, the output C73 is supplied as a carry input to the summing network 30, the output C74 is supplied as a carry input to the summing network 34, and the output C81 is supplied as a carry signal to the final summing network 38.

Figure 2:
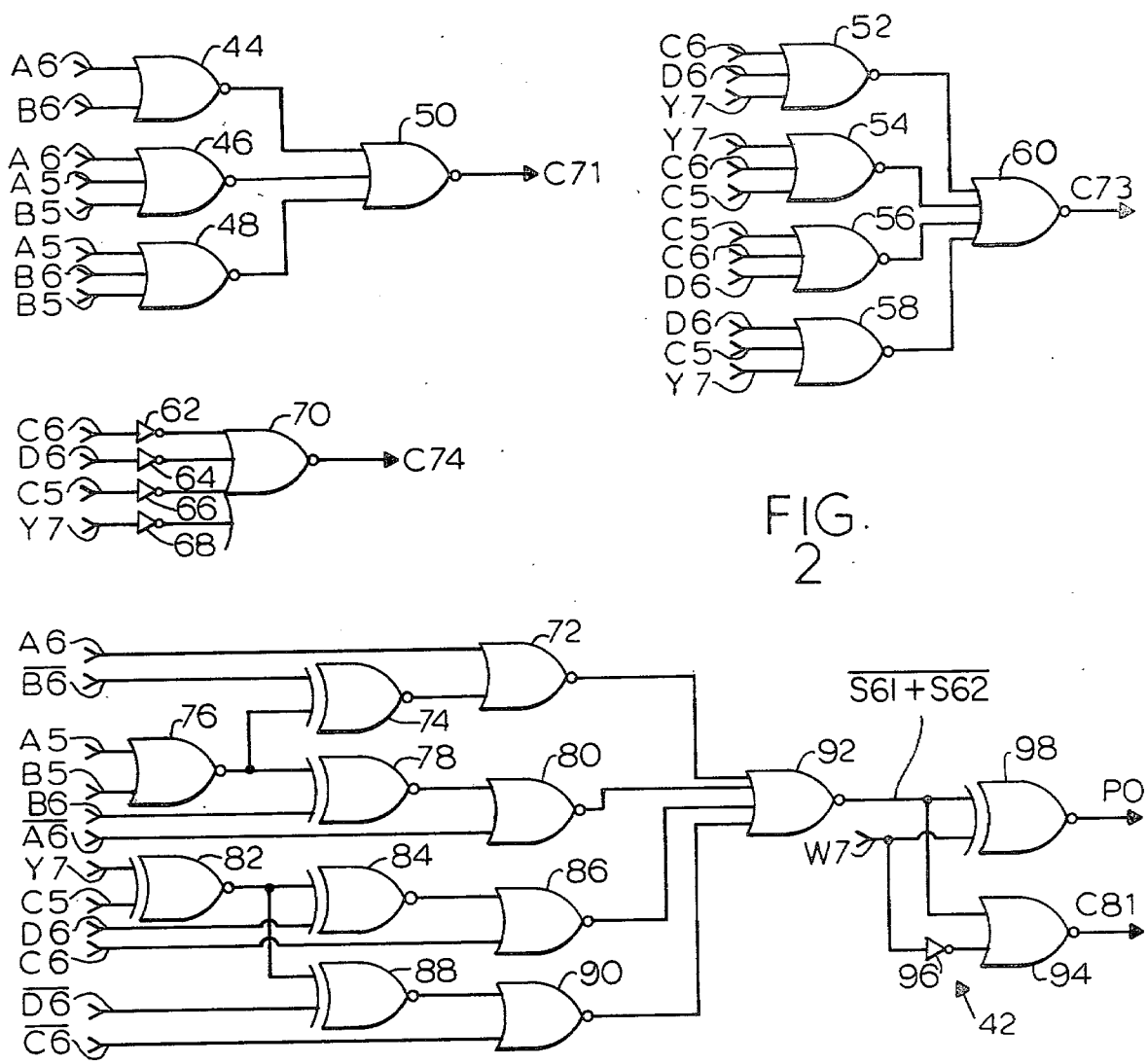
FIG. 2 is a logic diagram of a preferred implementation of the round off correction logic of the multiplier shown in FIG. 1.

Referring now to FIG. 2, the C71 carry signal is generated by four NOR gates 44, 46, 48 and 50 connected as follows: The A6 and B6 lines provide two inputs to the NOR gate 44; the lines A6, A5 and B5 are three inputs to the NOR gate 46; and the lines A5, B6 and B5 provide three inputs to the NOR gate 48. The inverted outputs of the NOR gates 44, 46 and 48 are provided as three inputs to the NOR gate 50. The output from the gate 50, being inverted, is the carry signal C71 provided to the summing network 28 (as shown in FIG. 1 and as already described). The gates 44, 46, 48 and 50 implement in hardware the boolean algebra equation (1) where n=8 and C[n−1]1=C71, as set out and discussed above.

Five NOR gates 52, 54, 56, 58, and 60 implement the n=8 logic equation (2) above and provide the carry signal C73 which is connected to the summing network 30 of the second stage of the multiplier 10. Lines C6, D6, and Y7 are inputs to the gate 52. Lines Y6, C6 and C5 are inputs to the gate 54; lines C5, C6 and D6 are inputs to the gate 56; and, lines D6, C5 and Y7 are inputs to the gate 58. The gates 52, 54, 56, 58, and 60 have their inverted outputs supplied as four inputs to the NOR gate 60 whose inverted output provides the carry signal C73 which is supplied to the summing network 30 as shown in FIG. 1.

The carry signal C74 generated from the logic equation (3) above (n=8) is generated from four lines C6, D6, C5, and Y7. These lines are inverted by inverters 62, 64, 66, 68 and supplied as inputs to a four input NOR gate 70, the inverted output of which provides the C74 carry signal to the summing network 34.

The C81 carry signal and the least significant bit output P0 utilize common logic to implement logical equations (4), (5), (6) and (7) above (n=8), and that logic will now be described. A line A6 is connected as one input to a NOR gate 72 having another input from the output of an exclusive NOR gate 74, one input to which is a line $\overline{B6}$. The other input to the exclusive NOR gate 74 is the output of a NOR gate 76 having two inputs connected to the lines A5 and B5. The output from the NOR gate 76 is also supplied as one input to another exclusive NOR gate 78 whose other input is supplied from the line C6. The output from the exclusive NOR gate 78 is provided as one input to a NOR gate 80 which has another input provided from the line $\overline{A6}$.

An exclusive NOR gate 82 is provided with two inputs from lines Y7 and $\overline{C5}$. The output of the exclusive NOR gate 82 is supplied as an input to another input exclusive NOR gate 84 whose other input is connected to the line D6. The output of the exclusive NOR gate 84 is connected to the NOR gate 86 having another input connected to the line C6. The output from the exclusive NOR gate 82 is also connected to an input of a two input exclusive NOR gate 88 whose other input is connected to the line $\overline{D6}$. The output of the exclusive NOR gate 88 is connected as an input to a NOR gate 90 having another input from the line $\overline{C6}$.

The outputs from the NOR gates 72, 80, 86 and 90 are applied as inputs to a four input NOR gate 92 which has an output ($S61 + \overline{S62}$ from equation (6) and (7) above connected as an input to a NOR gate 94. Another input to the NOR gate 94 is provided from the line W7 through an inverter 96. The output of the NOR gate 94 supplies the C81 carry signal which is connected to the fourth stage summing network 38 of the multiplier 10 as shown in FIG. 1.

The output of the NOR gate 92 is also connected as one input to an exclusive NOR gate 98 whose other input is directly connected to the W7 line. The output of the exclusive NOR gate 98 supplies the least significant bit signal P$\phi$ at the output 40 of the multiplier 10.

Figure 3:
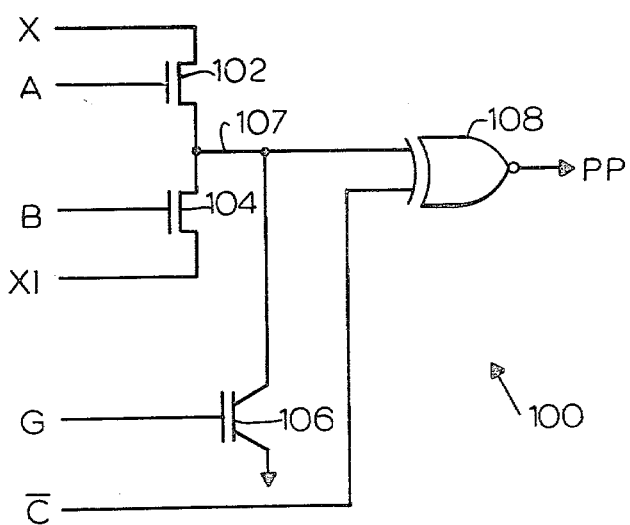
FIG. 3 is a general case hybrid logic and schematic circuit diagram of one of a series of partial product generators included within the multiplier, several of which are connected to the round off correction logic in accordance with the principles of the present invention.

Referring to FIG. 3, a general case partial product generator 100 is depicted with MOS gates 102, 104, 106 shown schematically and an exclusive NOR gate 108 shown logically. The gates 102 and 104 are in series, with the MOS V-gate 106 being in parallel across the gate 104. A line 107 is common to the gates 102, 104, 106 and provides one input to the gate 108. Another input to the gate 108 is from the $\overline{C}$ line. The gate 106 has its gate connected to a line G. As shown in FIG. 3, the element 100 is adapted for replication to provide all of the partial product generators 16, 18, 20, 22, 24, and 26 of the multiplier 10.

The general case partial product generator has the gate 102 connected to a multiplier bit line (X) which may be one of X11-X0. The gate 104 is connected to a multiplier bit line (X1) which is one bit position to the right of the bit line (X) connected to the gate 102. The lines A,B are control signals which multiplex (select) one of the bits (X) or (X1); the line A selects the (X) bit while the line B selects the (X1) bit. When neither of the A and B lines are enabled, the line 107 must be held low, and to accomplish this, the line G is activated. The line G is equal to NOT A or B ($\overline{A+B}$). The $\overline{C}$ line is connected to clock the output gate 108, and C corresponds to a multiplicand (Y) bit.

While the modified Booth's algorithm multiplier 10 shown in FIG. 1 is illustrated as applicable to a 12 bit multiplicand by 12 bit multiplier configuration, it is to be understood that it is equally applicable to other bit sizes of multiplicand and multiplier.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a binary digital multiplier implementing a modified Booth's algorithm and having a first stage of a plurality of partial product generators, a second stage of a plurality of summing networks including a first summation network and a second summation network, a third stage including a third summation network, and a fourth stage including a fourth summation network, said multiplier for generating a final product of a series of binary digits, the improvement comprising round off logic circuitry in said multiplier for rounding off to a predetermined nth bit least significant binary digit of said final product without generating the least significant binary digits to the right of said nth bit of said final product said circuitry including in said first stage a plurality of partial product generators for generating partial products from a multiplicand X and multiplier Y including a first least significant bits multiplier generator A, a second next least significant bits multiplier generator B, a third next least significant bits multiplier C and a fourth next least significant bits multiplier generator D (where the numerical subscript following a letter indicates significance of bit position therein);

said circuitry including a first carry signal generator stage connected to said partial product generators A and B for generating a first carry signal $C[n-1]1$ defined as equal to $(B[n-2]+A[n-2-])\cdot(A[n-2]+B[n-3]+A[n-3-])\cdot(A[n-3]+B[n-3]+B[n-2])$ and supplying said first carry signal $C[n-1]1$ to said first summation network;

said circuitry including a second carry signal generator stage connected to said partial product generators C and D for generating a second carry signal $C[n-1]3$ defined as equal to $(C[n-2]+C[n-3]+D[n-2]+Y[n-1])\cdot(C[n-2]-+C[n-3]+Y[n-1-])\cdot(C[n-2]+C[n-3]+D[n-2-])\cdot(C[n-3]+D[n-2]+Y[n-1])$ and supplying said second carry signal $C[n-1]3$ to said second summation network;

said circuitry including a third carry signal generator stage connected to said partial product generators for generating a third carry signal $C[n-1]4$ defined as equal to $C[n-2]\cdot D[n-2]\cdot Y[n-1]\cdot C[n-3]$ where $Y[n-1]$ is a multiplier bit two bit positions to the right of the nth bit position of the multiplier, and supplying said third carry signal $C[n-1]4$ to said third summation network;

said circuitry including a fourth carry signal generator and least significant bit final rounded product generator stage connected to said partial product generators and to said third summation network for generating a fourth carry signal $C[n]1$ defined as equal to $W[n-1]\cdot(S[n-2]1+S[n-2]2)$ and a least significant bit rounded product output Pn defined as equal to $W[n-1] \oplus (S[n-2]1+S[n-2]2)$ where $W[n-1]$ is the least significant bit carry signal from the third summation network, $S[n-2]1$ is defined as equal to $\overline{A[n-2]}\cdot[B[n-2] \oplus (A[n-3]+B[n-3])]+A[n-2]\cdot[\overline{B[n-2]} \oplus (A[n-3]+B[n-3])]$ and $S[n-2]2$ is defined as equal to $\overline{C(n-2)}\cdot[D[n-2] \oplus Y[n-1] \oplus C[n-3]]+C[n-2]\cdot[\overline{D[n-2]} \oplus Y[n-1] \oplus C[n-3]]$ and supplying said fourth summation network with said fourth carry signal and providing said least significant bit rounded product output Pn at the output of said multiplier.

2. In a binary digital multiplier implementing a modified Booth's algorithm and having a first stage of a plurality of partial product generators, a second stage of a plurality of summing networks including a first summation network and a second summation network, a third stage including a third summation network, and a fourth stage including a fourth summation network, said multiplier for generating a final product in excess of eight binary digits the improvement comprising round off logic circuitry in said multiplier for rounding off to the ninth least significant binary digit of said final product without generating the eight least significant binary digits of said final product said circuitry including in said first stage partial product generators for generating partial products from a multiplicand X and multiplier Y (where the subscript following a letter indicates significance of bit position therein);

said circuitry including a first carry signal generator stage connected to said partial product generators for generating a first carry signal C71 defined as equal to $(B6+A6)\cdot(A6+B5+A5)\cdot(A5+B5+B6)$, and supplying said first carry signal C71 to said first summation network;

said circuitry including a second carry signal generator stage connected to said partial product generators for generating a second carry signal C73 defined as equal to $C6+D6+Y7)\cdot(C6+C5+Y7)\cdot(C5+D6+Y7)\cdot(C6+C5+D6)$ and supplying said second carry signal C73 to said second summation network;

said circuitry including a third carry signal generator stage connected to said partial product generators for generating a third carry signal C74 defined as equal to $C6\cdot D6\cdot Y7\cdot C5$ (where Y7 is the seventh least significant bit of the multiplier), and supplying said third carry signal C74 to said third summation network;

said circuitry including a fourth carry signal generator and least significant bit final rounded product generator stage connected to said partial product generators and to said third summation network for generating a fourth carry signal C81 defined as equal to $W7\cdot(S61+S62)$ and a least significant bit rounded product output P$\phi$ defined as equal to $W7 \oplus (S61+S62)$ where W7 is the least significant bit carry signal from the third summation network, S61 is defined as equal to $\overline{A6}\cdot[B6 \oplus (A5+B5)]+A6\cdot[\overline{B6} \oplus (A5+B5)]$, and S62 is defined as equal to $\overline{C6}\cdot[D6 \oplus Y7 \oplus C5]+C6\cdot[\overline{D6} \oplus Y7 \oplus C5]$, and supplying said fourth summation network with said fourth carry signal and providing said least significant bit rounded product output P$\phi$ at the output of said multiplier.

* * * * *

UNITED STATES PATENT AND TRADEMARK OFFICE
CERTIFICATE OF CORRECTION

PATENT NO. : 4,229,800
DATED : October 21, 1980
INVENTOR(S) : Roubik Gregorian and Kadiri R. Reddy It is certified that error appears in the above—identified patent and that said Letters Patent is hereby corrected as shown below:

Column 1, line 13, delete "The", and substitute --That--;
Column 3, line 13, delete "bit:", and substitute --bit.--;
Column 4, line 3, delete "[d[n-2]", and substitute --[D[n-2]--;
Column 4, line 18, delete "alo", and substitute --alg--;
Column 4, line 19, delete "grithm", and substitute --orithm--;
Column 5, line 35, delete "38", and substitute --39--;
Column 7, line 5, delete "above", and substitute --above)--;
Column 9, line 17, delete "C6+D6+Y7)·(C6+D6+Y7", and substitute --(C6+D6+Y7)·(C6+C5+Y7--.

Signed and Sealed this

Twenty-fourth Day of February 1981

[SEAL]

Attest:

RENE D. TEGTMEYER

Attesting Officer    Acting Commissioner of Patents and Trademarks